(12) United States Patent
Fischer et al.

(10) Patent No.: US 6,509,539 B2
(45) Date of Patent: Jan. 21, 2003

(54) METHOD OF DRILLING DOVETAIL PINS

(75) Inventors: Todd Joseph Fischer, Ballston Spa, NY (US); David John Grubish, Maplewood, MN (US); Nick Scott, Norcross, GA (US); John Matthew Sassatelli, St. Paul, MN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,884

(22) Filed: Jun. 20, 2001

(65) Prior Publication Data

US 2002/0195428 A1 Dec. 26, 2002

(51) Int. Cl.$^7$ ................................. B23H 9/14
(52) U.S. Cl. .................. 219/69.17; 29/426.4; 29/889.1
(58) Field of Search ........................ 219/69.2, 69.17; 29/426.4, 889.1, 426.5; 408/1 R; 228/119

(56) References Cited

U.S. PATENT DOCUMENTS

| | | | |
|---|---|---|---|
| 2,165,485 A | * | 7/1939 | Jackman |
| 2,592,894 A | * | 4/1952 | Harding |
| 2,752,671 A | * | 7/1956 | Alyea |
| 3,508,321 A | * | 4/1970 | Wood |
| 3,939,321 A | * | 2/1976 | Bertrand et al. ........... 219/69.2 |
| 5,025,556 A | | 6/1991 | Stafford |
| 6,115,917 A | | 9/2000 | Nolan et al. ............... 29/889.1 |
| 6,389,692 B1 | * | 5/2002 | Wei et al. ................. 29/889.1 |

FOREIGN PATENT DOCUMENTS

JP    6-264912 A    *    9/1994

* cited by examiner

*Primary Examiner*—Geoffrey S. Evans
(74) *Attorney, Agent, or Firm*—Nixon & Vanderhye P.C.

(57) ABSTRACT

A method of removing a pin from a hole including a) drilling a first hole of a first diameter in the pin a selected fraction of a length dimension of the pin and attempting removal of the pin; b) if the pin cannot be removed, drilling a second hole of a second diameter smaller than the first diameter an extended fraction of the length dimension of the pin; and c) removing the pin.

15 Claims, 2 Drawing Sheets

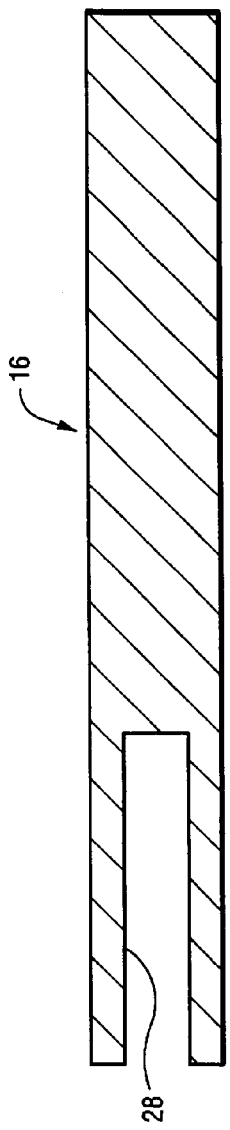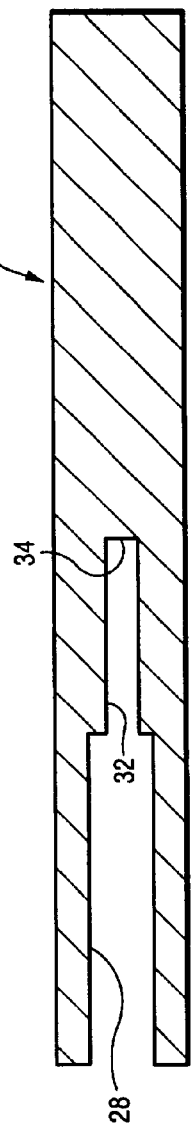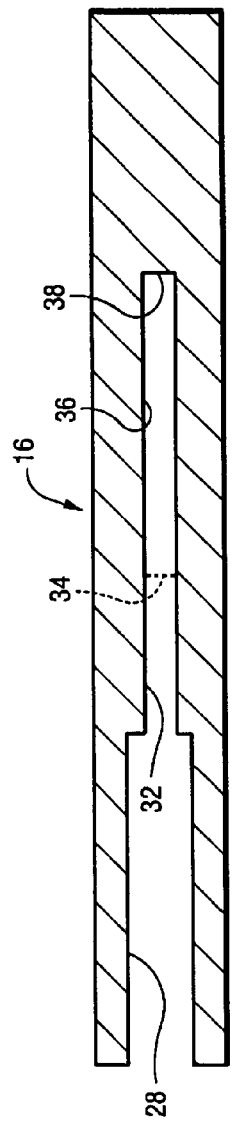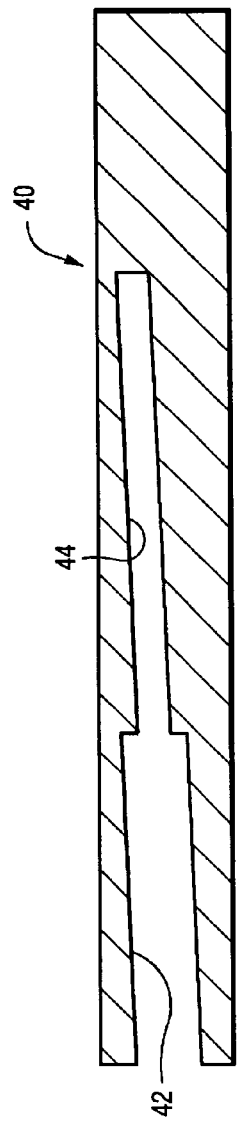

METHOD OF DRILLING DOVETAIL PINS

BACKGROUND OF INVENTION

This invention relates to a method of drilling dovetail pins, as well as auxiliary and cross keys installed in turbine rotors, to facilitate removal thereof.

Certain steam turbine buckets utilize a finger dovetail configuration to provide attachment of the buckets to the turbine rotor. Specifically, generally radially oriented fingers on a bucket mate with opposite mating fingers machined in the rotor. Each bucket dovetail has three axially extending dovetail pin holes that may be aligned with corresponding holes pre-drilled in the rotor. After the buckets are fit to the rotor, the dovetail pin holes in the buckets are aligned with the corresponding holes in the rotor. After all of the buckets have been installed, the pin holes are final-reamed to allow the installation of the dovetail pins that hold the buckets in place on the rotor. During operation in a severe environment, the dovetail pins may become stuck in the bucket and/or rotor pin holes due to pressure and temperature effects, oxidation, as well as stepping of the pins due to the buckets pulling radially on the pins as a result of centrifugal forces. Removal of these dovetail pins for inspection or replacement can be difficult, time consuming and costly.

Conventional methods of removing dovetail pins involve using a jack, a peening gun, and/or a powder actuated gun to push the pins out of the holes. If the pins do not move, and in the event the buckets were to be scrapped, one option has been to cut off the main section of the buckets and gang mill out the dovetail portion of the buckets from the rotor fingers. Residual material was removed by hand. If the buckets were to be saved, however, the dovetail pins were drilled through, using conventional manual drilling methods, and the left-over shells were removed again by hand. Another method used was to drill the pins part way through, insert a driver rod, and then push the pins out with a peening gun or powder actuated gun. Additional problems with the prior drilling methods involve: (1) a tendency for conventional drill bits to "walk" off center when drilling through a hard pin, and subsequently extend through the side of the pin and into the rotor; (2) the extensive time involved in hand picking out shells left when pins are drilled; (3) if the drilling is completed too deep into the pin, the driving operation can separate the end of the pin, leaving a partial shell in a hole which needs to be removed by hand; (4) when the pins are drilled, any initial misalignment of the drilling machine can also result in the drill bit or EDM electrode extending through the side of the pin and into the rotor. The deeper the drilling, the more profound the effect of misalignment and the greater the chance of rotor damage.

Summary of Invention

The present invention seeks to eliminate the above described problems associated with prior drilling methods. In the exemplary embodiment, a step drilling procedure is utilized which involves drilling a relatively large diameter hole (preferably using rapid EDM drilling) in the pin to be removed, for approximately ⅓ of the pin length. The electrode is then removed and pin removal is attempted via conventional means. If the pin does not move, the electrode is replaced with a smaller electrode and a smaller diameter hole is continued to a point beyond the midpoint of the pin. After the electrode is removed, pin removal is again attempted. If the pin still does not release, a final drilling step utilizes the same smaller electrode of the previous step to continue to drill the hole to about ¾ of the length of the pin. Testing has demonstrated that at this point, the pressure on the pin will be sufficiently relieved to enable removal of the pin. It is significant that the step down in electrode size while drilling deeper, accommodates any slight misalignment of the electrode, reducing the potential for drilling through the side of the pin and into the rotor.

Accordingly, in its broader aspects, the present invention relates to a method of removing a pin from a hole comprising a) drilling a first hole of a first diameter in the pin a selected fraction of a length dimension of the pin and attempting removal of the pin; b) if the pin cannot be removed, drilling a second hole of a second diameter smaller than said first diameter an extended fraction of the length dimension of the pin; and c) removing the pin.

In another aspect, the invention relates to a method for removing a dovetail pin from a turbine bucket-to-rotor finger dovetail arrangement wherein generally radially oriented fingers on the bucket and on a rotor wheel are interleaved and where a plurality of axially oriented dovetail pins secure the buckets to the rotor, the method comprising a) drilling a first hole in the pin of a first diameter and extending about ⅓ of an axial length dimension of the pin; b) drilling a second hole, continuing from the first hole, of a second diameter less than the first diameter, and extending about ½ the axial length dimension of the pin; c) drilling a third hole, continuing from the second hole, of a diameter substantially equal to the second hole, and extending about ¾ the axial length of the pin; and d) removing the pin.

Brief Description of Drawings

FIG. 2 is a schematic section through a dovetail pin, illustrating a first drilling step in accordance with the invention;

FIG. 3 is a view similar to FIG. 2, but illustrating continuation through a second drilling step in accordance with the invention;

FIG. 4 is a view similar to FIGS. 2 and 3, but illustrating continuation of the drilling through a third drilling step in accordance with the invention; and FIG. 5 is a view similar to FIG. 4 but illustrating how the present drilling operation accommodates axial misalignment of the drilling electrode.

DETAILED DESCRIPTION

Figure 1:
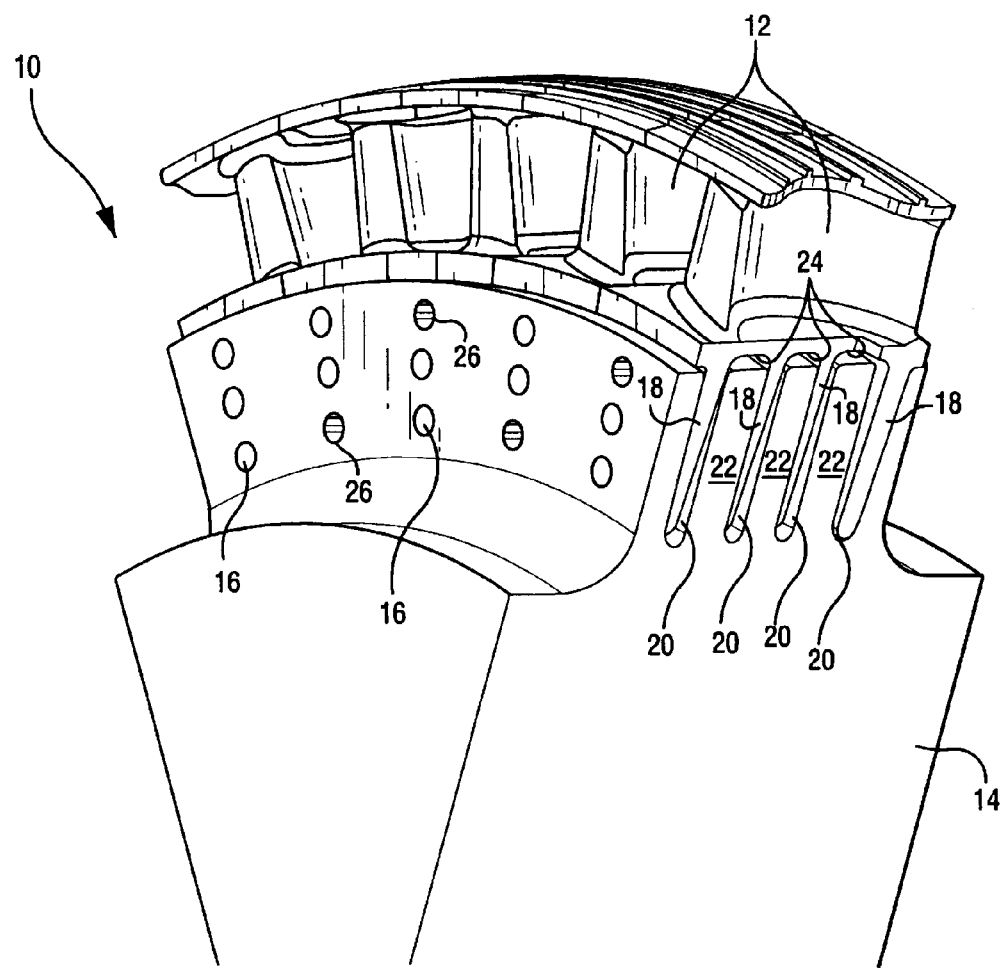
FIG. 1 is a cut-away perspective view illustrating in simplified fashion a finger dovetail configuration in a row of buckets on a turbine rotor wheel, with dovetail pins securing the buckets to the rotor.

In FIG. 1, a section 10 of a turbine wheel is shown including a plurality of buckets 12 secured to a turbine rotor wheel 14 by a finger dovetail arrangement coupled with a plurality of axially extending dovetail pins 16. More specifically, each bucket 12 has a plurality (four in the exemplary embodiment) of bucket dovetail projections or fingers 18 that are received within a plurality of rotor dovetail slots 20 therebetween. Similarly, the turbine wheel has a plurality of generally radially extending dovetail projections 22 received in a plurality of bucket dovetail slots 24 therebetween. During installation, after all of the buckets have been loaded onto the rotor wheel 14, the buckets 12 are adjusted so that the dovetail pin holes 26 in the rotor and in the buckets are in axial alignment. FIG. 1 illustrates some dovetail pins 16 in place as well as some empty holes 26 for ease of understanding. The holes 26 are formed in the bucket dovetail fingers as well as the rotor dovetail fingers, and are axially alignable. After the buckets have been loaded onto the wheel, the dovetail and rotor holes are aligned and then final-reamed to allow installation of the dovetail pins 16 which hold the buckets in place on the wheel. This invention relates to a drilling technique for subsequent removal of the pins 16 for inspection and/or replacement purposes.

With reference to FIGS. 2–4, the first step in the procedure is to drill a relatively large hole 28, with a diameter of, for example, 0.44 inch in a pin between about 5 and about 9 inches in length and having a diameter of about ½–⅝ inch, preferably using high speed EDM (electrical discharge machining) drilling procedures. This hole or bore is drilled to an axial length approximately equal to ⅓ of the pin length, terminating at 30. The electrode is then removed and pin removal is attempted, for example, by driving the rod through the hole with a driver, peening gun or powder actuated gun. If the pin cannot be removed, the electrode is replaced with a smaller electrode and drilling of a smaller hole 32, with a diameter of about 0.260 inch, is continued to a point about half way or just beyond half way along the length of the pin as shown in FIG. 3, terminating at 34. The electrode is removed and pin removal is again attempted, utilizing similar conventional procedures described above. If the pin still cannot be removed, a third and final drilling step employs the same smaller electrode and the hole 32 is continued with the same diameter of about 0.260 inch from the prior termination point 34 forward along an extended hole or bore 36 to about ¾ the length of the pin, terminating at 38. After the electrode is removed, the pin is again pushed, using conventional methods. All testing to date indicates that after this third drilling stage, pressure on the pin will be sufficiently relieved to enable it to be removed.

With reference to FIG. 5, it will be appreciated that the stepping down procedure in hole diameter accommodates slight axial misalignment, minimizing the chance that the drill bit will pass through the pin and damage the rotor. Thus, the Figure illustrates a pin 40 with a first hole 42 drilled generally axially of the pin, but with a slight axial misalignment. The misalignment is exaggerated through one or more smaller diameter drillings 44 but, because of the step-down feature, the drilled hole does not break through the side of the pin.

It will be understood that the invention is also applicable for the removal of auxiliary and cross keys used to secure the last-installed notch buckets and/or blocks used with pine tree or other bucket dovetail configurations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of removing a pin from a hole comprising:
   a) drilling a first hole of a first diameter in the pin a selected fraction of a length dimension of the pin;
   b) drilling a second hole of a second diameter smaller than said first diameter an extended fraction of the length dimension of the pin; and
   c) removing the pin.

2. The method of claim 1 including before step c), drilling a third hole in the pin a further extended fraction of the length of the pin.

3. The method of claim 2 wherein the third hole has a diameter substantially equal to said second diameter of said second hole.

4. The method of claim 1 wherein the pin has a diameter of between about ½ and ⅝ inch, and wherein said first hole has a diameter of about 0.4 inch.

5. The method of claim 4 wherein the second hole has a diameter of about 0.26 inch.

6. The method of claim 5 wherein the third hole has a diameter substantially equal to said second hole.

7. The method of claim 1 wherein said selected fraction is about ⅓.

8. The method of claim 1 wherein said extended fraction is about ½.

9. The method of claim 2 wherein said further extended fraction is about ¾.

10. The method of claim 1 wherein steps a) and b) are carried out utilizing electrical discharge machining.

11. A method for removing a dovetail pin from a turbine bucket-to-rotor finger dovetail arrangement wherein generally radially oriented fingers on the bucket and on a rotor wheel are interleaved and where a plurality of axially oriented dovetail pins secure the buckets to the rotor, the method comprising:
   a) drilling a first hole in the pin of a first diameter and extending about ⅓ of an axial length dimension of the pin;
   b) drilling a second hole, continuing from said first hole, of a second diameter less than said first diameter, and extending about ½ the axial length dimension of the pin;
   c) drilling a third hole, continuing from said second hole, and extending about ¾ the axial length of the pin; and
   d) removing the pin.

12. The method of claim 10 wherein steps a), b) and c) are carried out utilizing electrical discharge machining.

13. The method of claim 12 wherein the pin has a diameter of between about ½ and ⅝ inch, and the first hole has a diameter of about 0.4 inch.

14. The method of claim 13 wherein the second hole has a diameter of about 0.26 inch.

15. The method of claim 14 wherein the third hole has a diameter substantially equal to said second hole.

* * * * *